US007844587B2

(12) United States Patent  
Blakeley et al.

(10) Patent No.: US 7,844,587 B2  
(45) Date of Patent: Nov. 30, 2010

(54) WEB-BASED USER INTERFACE FOR SEARCHING METADATA-DRIVEN RELATIONAL DATABASES

(75) Inventors: Michael Blakeley, Foster City, CA (US); Syme Kutz, Orlando, FL (US); Carl Backstrom, Las Vegas, NV (US)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 11/187,701

(22) Filed: Jul. 22, 2005

(65) Prior Publication Data

US 2006/0155689 A1 Jul. 13, 2006

Related U.S. Application Data

(60) Provisional application No. 60/590,540, filed on Jul. 23, 2004.

(51) Int. Cl.  
*G06F 7/00* (2006.01)  
*G06F 17/30* (2006.01)

(52) U.S. Cl. .................. 707/705; 707/707; 707/758; 707/760; 715/234; 715/237

(58) Field of Classification Search .......... 707/999.003, 707/999.004, 999.005, 705, 707, 758, 760; 715/237, 234  
See application file for complete search history.

(56) References Cited

U.S. PATENT DOCUMENTS

| | | | | |
|---|---|---|---|---|
| 5,428,737 A | * | 6/1995 | Li et al. ..................... 707/4 |
| 5,761,656 A | * | 6/1998 | Ben-Shachar ................ 707/4 |
| 5,950,190 A | * | 9/1999 | Yeager et al. ................ 707/3 |
| 6,230,161 B1 | * | 5/2001 | Berkland et al. ........ 707/103 R |
| 6,266,675 B1 | * | 7/2001 | Evans et al. .............. 707/104.1 |
| 6,768,987 B1 | * | 7/2004 | Couch et al. ................ 707/3 |
| 6,768,997 B2 | * | 7/2004 | Schirmer et al. ........... 707/102 |
| 6,931,389 B1 | * | 8/2005 | Bleizeffer et al. ............. 707/2 |
| 6,961,734 B2 | * | 11/2005 | Kauffman ............... 707/103 Z |
| 6,988,095 B1 | * | 1/2006 | Dorfman ...................... 707/3 |
| 7,236,972 B2 | * | 6/2007 | Lewak et al. ................. 707/4 |
| 2001/0044754 A1 | * | 11/2001 | Fujii et al. ................... 705/26 |
| 2002/0138472 A1 | * | 9/2002 | Ricciardi ..................... 707/3 |

* cited by examiner

*Primary Examiner*—Vincent Boccio  
(74) *Attorney, Agent, or Firm*—Townsend and Townsend and Crew LLP (57) ABSTRACT

Web-based user interface systems and methods for searching metadata-driven relational databases. Instead of requiring developers to determine the exact type and number of search criteria for each application, the present invention advantageously provides a user-customizable search interface that, in certain aspects, leverages dynamic HTML, JavaScript, and dynamic SQL. A user may choose the exact type and number of search parameters, enabling the user to build a custom report without requiring the user to write any code. The system dynamically builds a SQL search query based on the user identified search parameters. Once a user has built a custom search using the interface, that search may be saved for re-use, and shared with other users.

18 Claims, 6 Drawing Sheets

*FIG. 1*

```
CREATE TABLE LOOKUP_TYPES
(
LTYPE_ID            NUMBER (15)         NOT NULL,
NAME                VARCHAR2 (240),
DESCRIPTION         VARCHAR2 (4000)     NOT NULL,
IS_RANGE            CHAR (1)            DEFAULT 'N'         NOT NULL,
IS_TREE             CHAR (1)            DEFAULT 'N'         NOT NULL,
IS_EDITABLE         CHAR (1)            DEFAULT 'N'         NOT NULL,
LAST_UPDATE_DATE    DATE                DEFAULT Sysdate     NOT NULL,
LAST_UPDATED_BY     VARCHAR2 (240)      NOT NULL,
CREATION_DATE       DATE                DEFAULT Sysdate     NOT NULL,
CREATED_BY          VARCHAR2 (240)      NOT NULL
)
/
```

*FIG. 2a*

```
CREATE TABLE LOOKUP_ITEMS
(
    LITEM_ID          NUMBER (15)       NOT NULL,
    LTYPE_ID          NUMBER (15)       NOT NULL,
    NAME              VARCHAR2 (240)    NOT NULL,
    ALIAS             VARCHAR2 (240),
    DESCRIPTION       VARCHAR2 (4000)   NOT NULL,
    SORT_ORDER        NUMBER (15),
    ACTIVE            CHAR (1)          DEFAULT 'Y'       NOT NULL,
    MIN_VAL           NUMBER,
    MAX_VAL           NUMBER,
    START_DATE        DATE              DEFAULT Sysdate   NOT NULL,
    END_DATE          DATE,
    ATTRIBUTE1        VARCHAR2 (240),
    ATTRIBUTE2        VARCHAR2 (240),
    ATTRIBUTE3        VARCHAR2 (240),
    ATTRIBUTE4        VARCHAR2 (240),
    ATTRIBUTE5        VARCHAR2 (240),
    ATTRIBUTE6        VARCHAR2 (240),
    ATTRIBUTE7        VARCHAR2 (240),
    ATTRIBUTE8        VARCHAR2 (240),
    ATTRIBUTE9        VARCHAR2 (240),
    ATTRIBUTE10       VARCHAR2 (240),
    ATTRIBUTE11       VARCHAR2 (240),
    ATTRIBUTE12       VARCHAR2 (240),
    ATTRIBUTE13       VARCHAR2 (240),
    ATTRIBUTE14       VARCHAR2 (240),
    ATTRIBUTE15       VARCHAR2 (240),
    LAST_UPDATE_DATE  DATE              DEFAULT Sysdate   NOT NULL,
    LAST_UPDATED_BY   VARCHAR2 (240)    NOT NULL,
    CREATION_DATE     DATE              DEFAULT Sysdate   NOT NULL,
    CREATED_BY        VARCHAR2 (240)    NOT NULL
)
/
```

*FIG. 2b*

```
CREATE TABLE LOOKUP_RELS
(
    LITEM_ID1          NUMBER (15)        NOT NULL,
    LITEM_ID2          NUMBER (15)        NOT NULL,
    LTYPE_ID           NUMBER (15)        NOT NULL,
    LAST_UPDATE_DATE   DATE               DEFAULT Sysdate    NOT NULL,
    LAST_UPDATED_BY    VARCHAR2 (240)     NOT NULL,
    CREATION_DATE      DATE               DEFAULT Sysdate    NOT NULL,
    CREATED_BY         VARCHAR2 (240)     NOT NULL
)
/
```

*FIG. 2c*

```
CREATE TABLE PROJECTS
(
PRODUCT_ID         NUMBER (15)        NOT NULL,       PRIMARY KEY,
PARTY_SITE_ID      NUMBER (15),
PROJECT_NAME       VARCHAR2 (240),
DESCRIPTION        VARCHAR2 (4000),
LAST_UPDATE_DATE   DATE               NOT NULL,
LAST_UPDATED_BY    VARCHAR2 (240)     NOT NULL,
CREATION_DATE      DATE               NOT NULL,
CREATED_BY         VARCHAR2 (240)     NOT NULL,
)
/
```

*FIG. 3a*

```
CREATE TABLE PROJECT_LOOKUP_USES
(
PLU_ID             NUMBER (15)        NOT NULL          PRIMARY KEY,
PROJECT_ID         NUMBER (15)        NOT NULL,
LTYPE_ID           NUMBER (15)        NOT NULL,
LITEM_ID           NUMBER (15)        NOT NULL,
PARENT_ID          NUMBER (15)        DEFAULT 0         NOT NULL,
SORT_ORDER         NUMBER (3)         DEFAULT 0         NOT NULL,
ATTRIBUTE1         VARCHAR2 (2000),
DATE_ATTR1         DATE,
REFERENCE          CHAR (1)           DEFAULT 'N'       NOT NULL,
WHITESPACE         CHAR (1)           DEFAULT 'N'       NOT NULL,
DEPLOYMENT         CHAR (1)           DEFAULT 'N'       NOT NULL,
LAST_UPDATE_DATE   DATE               NOT NULL,
LAST_UPDATED_BY    VARCHAR2 (240)     NOT NULL,
CREATION_DATE      DATE               NOT NULL,
CREATED_BY         VARCHAR2 (240)     NOT NULL,
)
/
```

*FIG. 3b*

Key References | My Customer Projects | Find Project | Create Project | Reports | Advanced Search | Saved Searches References/Deployments  Manage Home   Log Out   Help

Advanced Search

Search Parameters

| Choose... ▼ | | | |
|---|---|---|---|
| Customer License Sales Classification ▼ | is ▼ | Any ▼ | And ▼ Remove Line |
| Customer Name (OSO) ▼ | like ▼ | | ▼ Or ▼ Remove Line |
| Competitor ▼ | is ▼ | Baan (Invensys) ▼ | And ▼ Remove Line |
| Competitor ▼ | is ▼ | Siebel ▼ | And ▼ Remove Line |
| Choose... ▼ | | | Remove Line |

110   120   130   140

Add   145

Cancel   Search

Home   Logout   Help

*FIG. 4*

WEB-BASED USER INTERFACE FOR SEARCHING METADATA-DRIVEN RELATIONAL DATABASES

CROSS-REFERENCES TO RELATED APPLICATIONS

This application claims benefit of U.S. Provisional Application No. 60/590,540, filed Jul. 23, 2004, which application is incorporated herein by reference for all purposes.

BACKGROUND OF THE INVENTION

The present invention relates generally to database searching and in particular to a web-based search interface for use in searching a metadata-driven relational database.

Web-based database applications frequently benefit from a user interface (UI) for searches of the database. In a typical application, this may include a simple form, with a finite number of search parameters. In a complex application, users may be limited to the number and type of criteria provided by the developer, and may be frustrated by an inability to graphically build custom queries. To work around this problem, separate tools known as "reporting front-ends" have been created. Using these tools frequently requires developer intervention and knowledge of the data model, which works against the self-service orientation of the original web application interface.

While web-based user interfaces have matured rapidly since 1993, end-user applications are still significantly easier to user. Improving the usability of web applications would be desirable as it would provide a competitive benefit by improving the end-user experience and end-user productivity. In many business applications, users spend a significant amount of time finding the records that they need to work with. Specifying and developing reports is also a large consumer of user productivity, especially when having to deal with an inflexible UI, e.g., hand-filtering the results of an inflexible search UI.

Accordingly, it is desirable to provide improved web-based search systems and methods that reduce the amount of user time required to obtain records and develop reports, and which provide an efficient and flexible UI.

BRIEF SUMMARY OF THE INVENTION

The present invention provides an improved web-based user interface for searching metadata-driven relational databases. Instead of requiring developers to determine the exact type and number of search criteria for each application, the present invention advantageously provides a user-customizable search interface that, in certain aspects, leverages dynamic HTML, JavaScript, and dynamic SQL. A user may choose the exact type and number of search parameters, enabling the user to build a custom report without requiring the user to write any code. The system dynamically builds a SQL search query based on the user identified search parameters. Once a user has built a custom search using the interface, that search may be saved for re-use, and shared with other users. The present invention is particularly useful in any web-based RDBMS application that uses a metadata-driven model.

One advantage of the present invention is that it reduces development expenses over the lifetime of the application, since users can assemble their own custom searches without developer intervention. Once these searches have been prepared, they can be re-used and shared among user communities.

According to an aspect of the invention, a computer-implemented method is provided for dynamically building SQL queries for use in a relational database system. The method typically includes providing a query builder page to a client system over a network connection, the page including at least one search parameter selection field including a plurality of searchable types, at least one operator selection field and at least one value selection field, receiving a user selection of a first searchable type in the at least one search parameter selection field from the client system, receiving a user selection of a first operator in the at least one operator parameter selection field from the client system, receiving a user selection of a first value in the at least one search value parameter selection field from the client system, and dynamically building a SQL query based on the user selections in the parameter selection field, operator selection field and value selection field.

According to another aspect of the invention, a database system is provided that typically includes a metadata-driven relational database, including a plurality of metadata lookup tables, a server module for providing a query building page to a client system over a network connection, wherein the page includes at least one search parameter selection field including a plurality of searchable types, at least one operator selection field and at least one value selection field, and a SQL engine for automatically generating SQL queries in response to user selections in the selection fields of the query building page.

According to yet another aspect of the invention, a computer-readable medium including code for controlling a processor to dynamically generate a SQL query for searching a database is provided. The code typically includes instructions to provide a query builder page to a client system over a network connection, the page including at least one search parameter selection field including a plurality of searchable types, at least one operator selection field and at least one value selection field, to receive user selected search parameters from the client system, the user selected search parameters including a user selection of a first searchable type in the at least one search parameter selection field, a user selection of a first operator in the at least one operator parameter selection field, and a user selection of a first value in the at least one search value parameter selection field, and to automatically build a SQL query based on the received user selected search parameters.

According to a further aspect of the invention, a computer-implemented method is provided for performing a web-based search on a relational database system. The method typically includes receiving a query builder page from a database server of the relational database system over a network connection, the page including at least one search parameter selection field including a plurality of searchable types, at least one operator selection field and at least one value selection field, receiving user selected search parameters, the user selected search parameters including a first searchable type in the at least one search parameter selection field from the client system, a first operator in the at least one operator parameter selection field, and a first value in the at least one search value parameter selection field, and transmitting the user selected search parameters to the database server. The method also typically includes receiving a search response page from the database server responsive to transmission of the user selected search parameters, wherein the database server dynamically builds a SQL query based on the user selected search parameters and executes the SQL query to generate the search response page.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

System Framework Architecture

Figure 1:
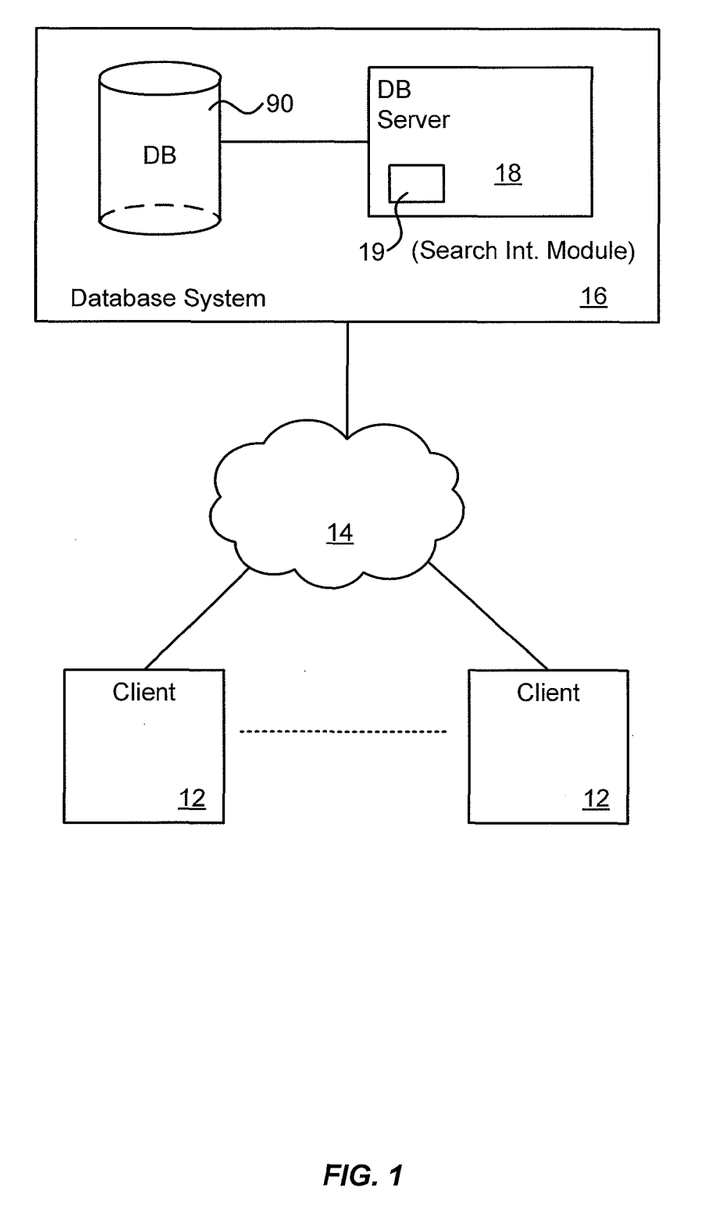
FIG. 1 illustrates a database system where the search interface system of the present invention might be used.

FIG. 1 illustrates a database system 16 wherein the search interface system of the present invention might be used. As illustrated in FIG. 1, any user systems 12 might interact via a network 14 with database system 16. The users of those user systems 12 might be users in differing capacities and the capacity of a particular user system 12 might be entirely determined by the current user. For example, where a developer is using a particular user system 12 to interact with database system 16, that user system has the capacities allotted to that developer. However, while an administrator (e.g., DBA) is using that user system to interact with system 16, it has the capacities allotted to that administrator. System 16 also includes, in one aspect, a separate storage module (not shown), such as one or more hard disks for storing user searches, search parameters, search results and other data.

Network 14 can be a LAN (local area network), WAN (wide area network), wireless network, point-to-point network, star network, token ring network, hub network, or other configuration. One of the most common type of network in current use is a TCP/IP (Transfer Control Protocol and Internet Protocol) network such as the global internetwork of networks often referred to as the "Internet" with a capital "I". For example, user systems 12 might communicate with system 16 using TCP/IP and, at a higher network level, use other common Internet protocols to communicate, such as HTTP, FTP, AFS, WAP, etc.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs a client interface module, such as an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., DBA) of user system 12 to access, process and view information and pages available to it from system 16 over network 14. Each user system 12 also typically includes one or more user interface devices, such as a keyboard, a mouse, touch screen, pen or the like, for interacting with a graphical user interface (GUI) provided on a display (e.g., monitor screen, LCD display, etc.) in conjunction with pages, forms and other information provided by system 16 or other systems or servers. The client interface module of system 12 typically implements or interfaces with a server module 18. Server module 18 is, in certain aspects, configured to create search web pages for display at client system 12 in response to network requests from client 12. As discussed above, the present invention is suitable for use with any type of network such as the Internet, an intranet, an extranet, a virtual private network (VPN), a non-TCP/IP based network, any LAN or WAN or the like.

According to one embodiment, each user system 12 and all of its components are operator configurable using applications, including computer code run using a central processing unit such as an Intel Pentium processor or the like. Similarly, database system 16 and all of its components (e.g., server module 18, search module 19, etc.) might be operator configurable using application(s) including computer code run using a central processing unit such as an Intel Pentium processor or the like, or multiple processor units. Computer code for operating and configuring database system 16 to intercommunicate and to process and store tables, pages, search parameters and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a computer, server or server system such as, for example, in C, C++, HTML, DHTML, XML, Java, JavaScript, or any other markup language or scripting language, such as VBScript, Perl, Python, or TCL.

According to one embodiment, system 16 includes a database 90 for storing objects and data according to various object schema. For example, database 90 typically stores data created and used by an enterprise. In one embodiment, database 90 is a relational database, and database system 16 implements a database server management application (e.g., Oracle 9i or 10g) adapted to store, update and retrieve data based on SQL-formatted and other types of commands. The database server application may be implemented as part of server module 18 or as a separate client resident on system 16. If more than one database system is used, they may be located in close proximity to one another (e.g., in a server farm located in a single building or campus), or they may be distributed at locations remote from one another (e.g., one or more servers located in city A and one or more servers located in city B). The system 16, in one aspect, could be implemented in a standalone system with an associated data storage repository or database, or it could include one or more logically and/or physically connected servers distributed locally or across one or more geographic locations. Additionally, the term "server" is meant to include a computer system, including processing hardware and process space(s), and an associated database storage system and database server application (e.g., Oracle RDBMS such as Oracle 9i or 10g) as is well known in the art. It should also be understood that "server system" and "server" may be used interchangeably herein. Similarly, the databases described herein can be implemented as single databases, a distributed database, a collection of distributed databases, a database with redundant online or offline backups or other redundancies, etc., and might include a distributed database or storage network and associated processing intelligence. The database may also be implemented in a clustered environment.

In one aspect, a search interface module 19 is provided to expose the database and other internal and external clients to an external user. For example, the search interface module 19 provides, in one aspect, a graphical user interface (GUI) that allows a user at a client system 12 to interact with the database and various internal and external client modules to perform a custom search and store the results as will be described herein. Thus, in one aspect, an external client such as a database administrator or other user, using a browser on client system 12, may interact with the search interface module 19 to access the database, perform a custom search and view a search report generated by the search interface module 19. Search interface module 19 may be implemented as a component of server module 18 or as a separate client resident on system 16.

In one aspect of the present invention, a schema is provided including three database lookup tables as follows:

LOOKUP_TYPES: the different types, or categories, of lookup values

LOOKUP_ITEMS: the lookup values themselves

LOOKUP_RELS: the relationships between various LOOKUP_ITEMS entries.

Figure 2A:
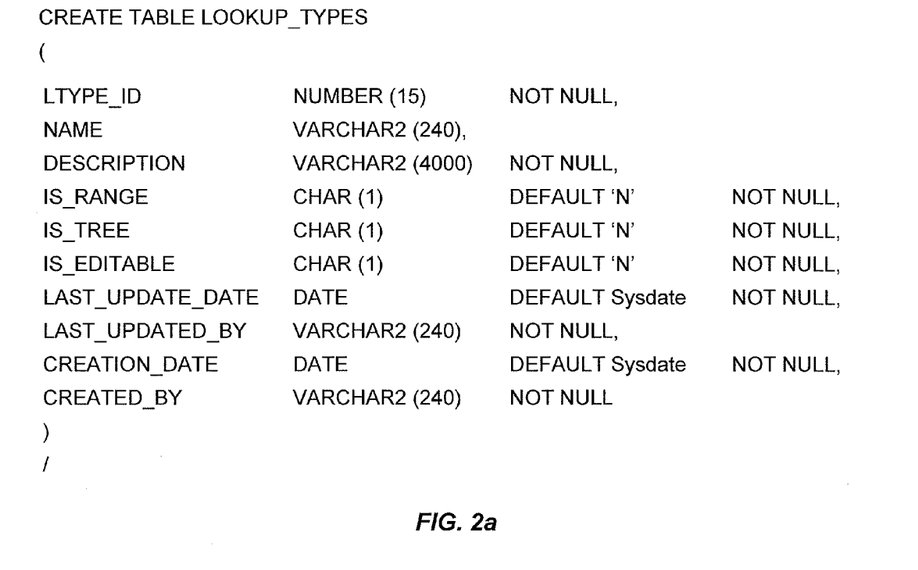
FIGS. 2a-2c illustrate example of lookup tables according to one schema.
Figure 2B:
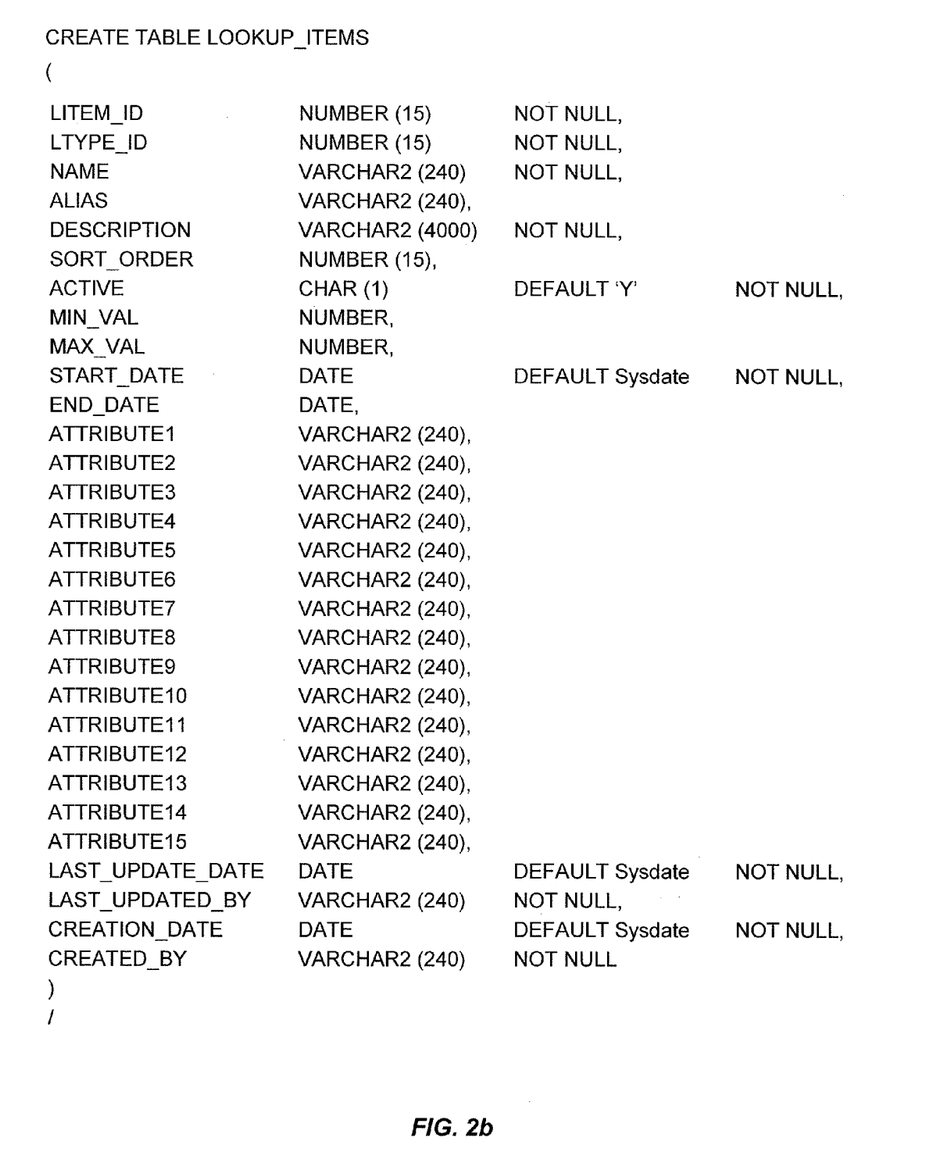
Figure 2C:
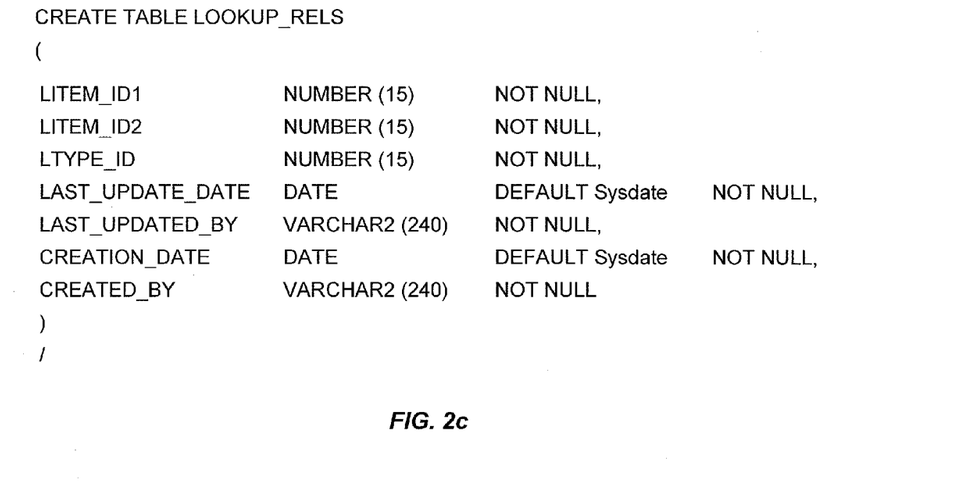

Each of the schema's tables includes various fields, examples of which are shown in SQL in FIGS. 2a-2c. With such a metadata-driven model, most feature requests can be seamlessly implemented without any changes to the schema's tables. To capture a new attribute of an existing type in this schema, the new value is added to the list of values (LOV) (e.g., attribute fields) in LOOKUP_ITEMS. To capture a new type of attribute, the new LOV is added to LOOKUP_TYPES and LOOKUP_ITEMS. To capture a new relationship between attributes, the relationship is added to LOOKUP_RELS.

In the example shown in FIGS. 2a-2c, every LOOKUP_ITEMS.LTYPE_ID is a foreign key into LOOKUP_TYPES.LTYPE_ID, every LOOKUP_RELS.LTYPE_ID is a foreign key into LOOKUP_TYPES.LTYPE_ID, and every LOOKUP_RELS.LITEM_ID1 and LOOKUP_RELS.LITEM_ID2 is a foreign key into LOOKUP_ITEMS.LITEM_ID. LOOKUP_TYPES may exist without any corresponding LOOKUP_ITEMS, and LOOKUP_ITEMS may exist without any corresponding LOOKUP_RELS (these are called "flat lookup types"). Also, the LOOKUP_RELS.LTYPE_ID may be a copy of the corresponding LOOKUP_ITEMS.LTYPE.ID, or it may describe the relationship between LITEM_ID1 and LITEM_ID2. For example, consider these LOOKUP_ITEM records:

SYBASE (ltype_id maps to COMPETITOR)
DATABASE (ltype_idmaps to PRODUCT)
ORACLE LITE (ltype_id maps to PRODUCT)

To show that SYBASE competes with DATABASE, a row is inserted into LOOKUP_RELS:
litem_id1: DATABASE
litem_id2: SYBASE
ltype_id: COMPETITOR But to show that DATABASE is the parent-product of ORACLE LITE, another LOOKUP_RELS row is inserted:
litem_id1: DATABASE
litem_id2: ORACLE LITE
litem_id: PRODUCT.

Throughout this document, LOOKUP_ITEMS.NAME and LOOKUP_TYPES.NAME values are synonomous with "the LITEM_ID corresponding to . . . " and "the LTYPE_ID corresponding to . . . ".

APIs

In certain aspects, a plurality of APIs are provided for simple operations on these lookup tables, examples of which include the following:

getAlias(p_item_id In Number) returns the human-readable alias for the input litem_id.

getDescription(p_item_id In Number) returns a longer human-readable description for the input litem_id.

getId(p_type In Number, p_name In Varchar2) returns the litem_id for the input ltype_id and name, or null if no such row exists in LOOKUP_ITEMS.

getId(p_typename In Varchar2, p_name In Varchar2) looks up the ltype_id from p_typename, and joins on LOOKUP_ITEMS.name to return an litem_id (or null if no such LOOKUP_ITEM exists).

getOrAdd(p_type In Number, p_name In Varchar2, p_alias In Varchar2, p-sortorder In Number, p_description In Varchar2, p_active In Varchar2) returns the new or existing litem_id: in one aspect, if a row in LOOKUP_ITEMS already exists with the input type and name, the other attributes are not updated.

getOrAddRel(p_Type IN Number, p_Id1 IN NUMBER, p_Id2 IN NUMBER) is a procedure: it creates a row in LOOKUP_RELS with the specified properties, unless such a row already exists.

getOrAddUniqueRel(p_TypeIN Number, p_Id1 IN NUMBER, p_Id2 IN NUMBER) is a function, similar to getOrAddRel. But getOrAddUniqueRel only checks the input type and id2 for prior existence. So you can call use this function to ensure that there is never more than one parent for a given type and child. This function returns the new or existing id1.

getOrAddType(p_typename In Varchar2, p_descritpion In Varchar2, p_is_tree In Varchar2, p_is_editable In Varchar2) returns the new or existing ltype_id. In one aspect, if a row in LOOKUP_TYPES already exists with the input p_typename, the other attributes are not updated.

getTypeId(p_typename In Number) returns the numeric ltype_id of the input type name.

getTypeId(p_item_id In Number) returns the numeric ltype_id of the input litem_id.

Projects and Project Attributes

Figure 3A:
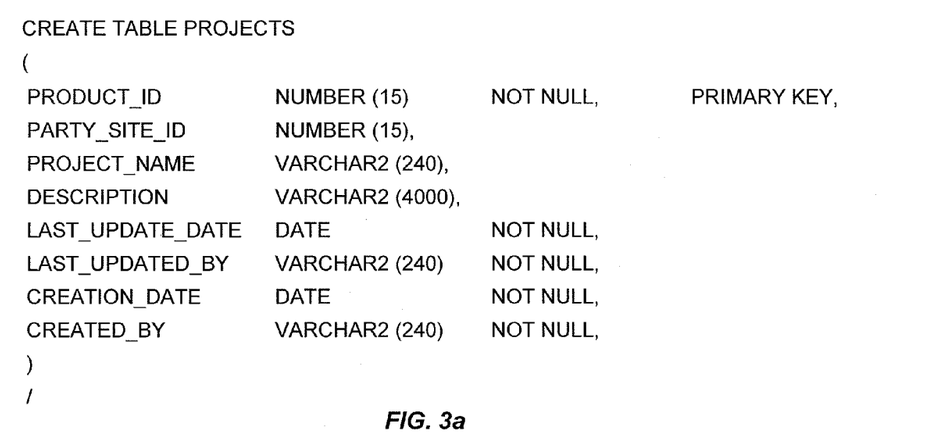
FIGS. 3a and 3b illustrate tables provided to allow for creation of projects.
Figure 3B:
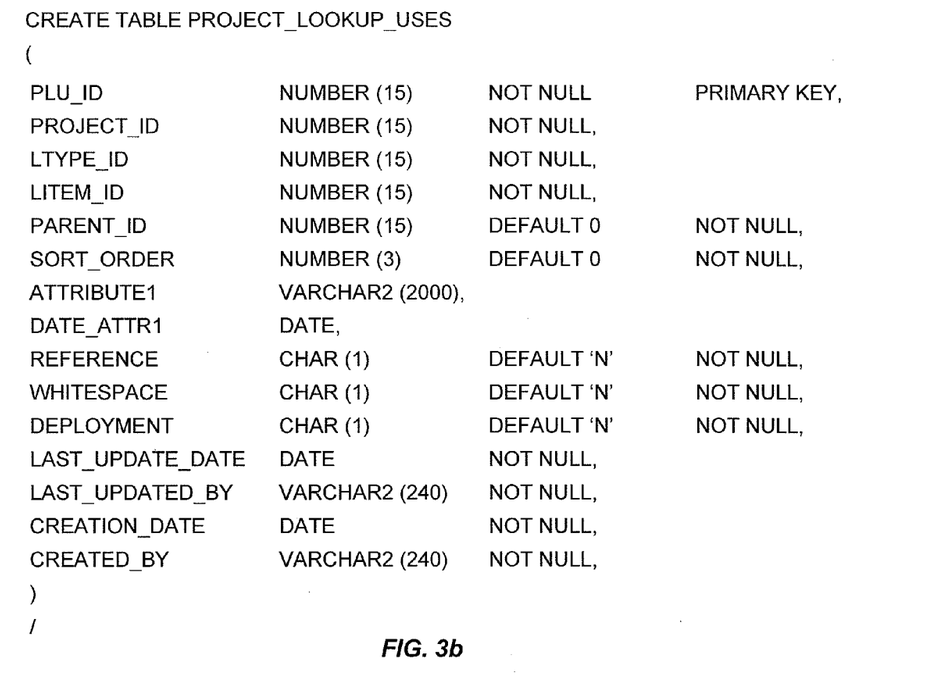

In certain aspects, two additional tables are provided to allow for creation of projects, e.g., at a customer site: PROJECTS and PROJECT_LOOKUP_USES (PLU). FIGS. 3a and 3b show example of both tables in SQL.

The two-table model shown in FIGS. 3a and 3b may be used to capture basic information about a project, e.g., at a customer site, as a row in PROJECTS. Once a project_id exists in PROJECTS, any number of project attributes can be captured in PROJECT_LOOKUP_USES. The PLU.PROJECT_ID column is a foreign key to the base PROJECTS.PROJECT_ID. The PLU.LTYPE_ID column is a foreign key to LOOKUP_TYPES.LTYPE_ID, while PLU.LITEM_ID maps to LOOKUP_ITEMS.LTEM_ID. Finally, PLU.parent_id can be 0 to indicate a "root" project-attribute, or it can be a foreign key to an existing PROJECT_LOOKUP_USES plu_id. This allows for the capture of a hierarchical relationship between attributes. Together, these four columns (project_id, parent_id, ltype_id, litem_id) form a unique constraint.

An example will now be shown. First a project is created ("Lookup_Pkg" provides the APIs):

```
declare
    l_proj_id Number;
    l_plu_id Number;
    l_productPt Number := Lookup_Pkg.getTypeID('PRODUCT');
    l_product_db Number :=
    Lookup_pkg.getID(l_product_t, 'DATABASE');
    l_version_t Number :=
    Lookup_Pkg.getTypeID('PRODUCT_VERSIONS');
    l_version_9i Number := Lookup_Pkg.getID(l_version_t, '9I');
begin
INSERT INTO PROJECTS (project_name)
VALUES ('test project')
RETURNING project_id INTO l_proj_id;
```

The new project_id was generated by a trigger on PROJECTS, using a sequence. Now some attributes are added: first, it will be recorded that this project uses the DATABASE product:

```
INSERT INTO PROJECT_LOOKUP_USES
(project_id, parent_id, ltype_id, litem_id)
VALUES (l_proj_id, 0, l_product_t, l_product_db)
RETURNING plu_id INTO l_plu_id;
Next, another piece of data is added: the DATABASE is version 9i
INSERT INTO PROJECT_LOOKUP_USES
(project_id, parent_id, ltype_id, litem_id)
VALUES (l_proj_id, l_plu_id, l_version_t, l_version_9i);
end;
/
```

Since as many child-records as needed may be added, additional versions may be added to that same DATABASE plu_id. Child-records may also be added with other ltype_ids, such as PRODUCT_STATUS or IMPLEMENTORS. This provides a very flexible mechanism for capturing detailed information about arbitrary lists of values.

Lookup Types

According to one aspect, examples of useful Lookup Types include the following:

APPLICATION_CODE: 'R' or 'D', for References or Deployments. May be used to indicate the application(s) associated with a PLU.

COMPANY_REVENUE: corresponding litem_id stores a value for the company's annual revenue.

COMPETITOR: corresponding litem_id stores a value for a competing company.

DATE_ATTRIBUTE: corresponding litem_id stores a value for the date-attribute subcategory (PROJECT_START_DATE is one) and the date itself is stored in the corresponding date-attr1 column.

DEPLOYMENT_CATEGORY: corresponding litem_id stores a value for a deployment category.

GEOGRAPHY: corresponding litem_id stores a value for a geographic region.

GLOBAL_COMPETITOR: corresponding litem_id stores a value for a known competitor.

IMPLEMENTORS: corresponding litem_id stores a value for an implementor.

INDUSTRY: corresponding litem_id stores a value for an industry.

ISO_COUNTRY_CODE: corresponding litem_id stores a value for a two-letter ISO country code.

KEY_REFERENCE: indicates that the associated project is a "key reference". This is only valid with parent id=0. The litem_id will not be of ltype_id KEY_REFERENCE—instead, it will correspond to an INDUSTRY, GEOGRAPHY, or REFERENCE_CAMPAIGN.

LANG_TYPE: corresponding litem_id stores a value for a language.

LOCALIZATION: corresponding litem-id stores a value for localization.

PARTNER: corresponding litem_id stores a value for a partner, e.g., a member of the Oracle Partner Network.

PARTNER_TYPES: corresponding litem_id stores a value for the type of partner (parallel list with PARTNER, above).

PLATFORM: corresponding litem_id stores a value for a deployment platform.

PRODUCT: corresponding litem_id stores a value for a product, e.g., an Oracle product.

PRODUCT_STATUS: corresponding litem_id stores the parent_id's product status. The parent_id must point to a PLU or ltype_id PRODUCT.

PRODUCT_VERSIONS: corresponding litem_id stores the parent_id's product version. The parent_id must point to a PLU of ltype_id PRODUCT.

PRODUCT_VERSIONS_FROM: corresponding litem_id stores the parent_id's product version. The parent_id must point to a PLU of ltype_id PRODUCT.

PRODUCT_VERSIONS_TO: corresponding litem_id stores the parent_id's future product_version. The parent_id must point to a PLU of ltype_id PRODUCT.

REFERENCE_ACTIVITY: corresponding litem_id stores a value for a reference activity.

REFERENCE_CAMPAIGN: corresponding litem_id stores a value for a reference marketing category.

SALES_ORGS: corresponding litem_id stores a value for a sales organization.

SATISFACTION_LEVEL: corresponding litem_id stores a value for a satisfaction level.

UPGRADE_STATUS: corresponding litem_id stores the project's deployment status. This is only valid with parent_id=0.

UPGRADE_TYPE: corresponding litem_id stores the project's deployment type. This is only valid with parent_id=0.

It should be appreciated that the above lookup types are merely examples and that numerous other lookup types may be defined as desired.

Search Interface

In one embodiment, the present invention provides a search interface that allows a user to custom build a search query. Referring back to FIG. 1, in response to a network request from a client system 12, search interface module 19 provides a query page to system 12 for use by a user in creation of a custom search query. As a user selects or identifies search parameters in the query building web page, the user-selected parameters are sent back to search interface module 19 and the a query, e.g., SQL query, is dynamically created based on the user-selected parameters. The parameters may then be stored, e.g., to re-run or share the search at a later time.

Figure 4:
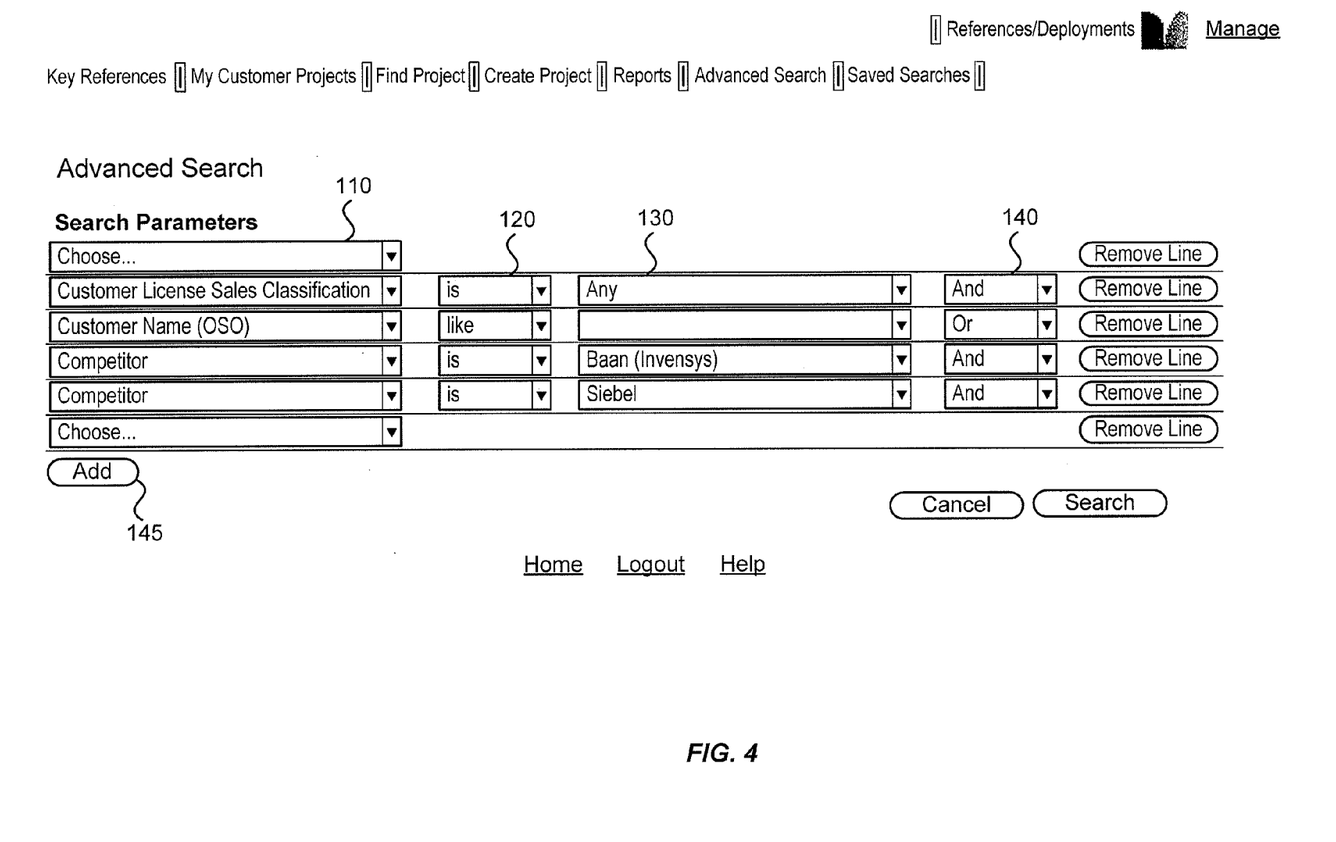
FIG. 4 illustrates an example of a search interface page according to an embodiment of the present invention.

FIG. 4 illustrates an example of a query building web page 100 provided to a user according to one embodiment. As shown, a search parameter selection field 110 allows a user to select from a plurality of searchable types. In one aspect, all types in that are searchable are provided in a dropdown list. For example, in one aspect, the system determines whether a type in LOOKUP_TYPES is searchable based on whether the type is defined as a searchable type. For example, the creator is given the option of registering an attribute type as a searchable type in the type definition when created, or a user may register the type later. A value selection field 130 is also provided to allow a user to select or identify a desired value. For example, the value selection field may include a dropdown menu including selectable values, or a text expression box, that allows a user to select or enter a value as desired, e.g., using a keyboard or other user-interface device. An operator selection field 120 is also provided to allow a user to select or enter a search logic expression such as "is", "like", or a mathematical expression such as "=", "<", ">" and others as are well know. A logical operator field 140 is provided for use when additional search parameters are selected to be entered using "add" button 145. Examples of logical operators include "OR", "AND", "AND NOT" and many others as are well known. As shown in FIG. 4, multiple search parameters have been identified by a user. A user may enter any number of search terms as desired. For example, the add button 145 allows the user to continue to add search types, values and logic to the search, and the SQL engine generates the SQL query based on all the user selected terms and logic. Additionally, search terms may be removed, for example using the remove line buttons, or altered, for example, by changing the selection in a drop down menu or the text in a text entry box. In this manner, the user may custom build and modify a search based on the underlying relational database types and values available for searching.

As search parameters are entered in to the various fields 110, 120, 130 and 140, a SQL query is dynamically created by search interface module 19. A SQL engine receives the parameters and builds a SQL query.

In preferred aspects, the user identified search parameters are stored for later use. For example, a user may wish to re-run the same search at a later date, or they may wish to share the search with other users. In one aspect, the parameters are stored to the database 90 or as a datafile in a hard disk or other memory unit associated with system 16 for later use. Alternatively, the SQL query generated based on the user-identified parameters is stored. However, it is preferred that the search parameters are stored and another SQL query generated when the search is requested at a later date as this allows for efficient optimization of the SQL query, especially if the database has changed sufficiently to warrant optimization.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of dynamically building SQL queries for use in a metadata-driven relational database system, the method comprising:
   storing, in a database associated with the database system, metadata lookup tables that describe objects and data that are stored in the database according to a first object schema, the metadata lookup tables stored in the database according to a second object schema allowing types of objects to be added to the first lookup table without changes to the first object schema, the second schema including a first lookup table configured to store different types of lookup values, a second lookup table configured to store the lookup values for the first table, and a third lookup table configured to store relationships between lookup values in the second lookup table;
   generating, at one or more computer systems associated with the database system, information configured for displaying a query builder page and forwarding the information to a client system over a network connection, said page including:
   (a) at least one search parameter selection field configured as a dropdown menu wherein a predetermined searchable type is enabled to be selected from a list of searchable types populated by the first lookup table in the metadata lookup tables,
   (b) at least one operator selection field separate from the at least one search parameter selection field, and
   (c) at least one value selection field configured as a dropdown list and a text expression box wherein at least one value is enabled to be selected from a list of values populated by the second lookup table in the metadata lookup tables or entered by a user as an expression;
   receiving, at the one or more computer systems, a user selection of the predetermined relationship type between items in the at least one search parameter selection field, a user selection of a first operator in the at least one operator selection field, and a user selection of a first value representing an item in the at least one value selection field;
   dynamically building an SQL query with one or more processors associated with the one or more computer systems based on the user selections in the at least one parameter selection field, at least one operator selection field, and at least one value selection field; and
   storing the user selections in the at least one parameter selection field, the at least one operator selection field, and the at least one value selection field in the database associated with the database system, wherein the user selections are able to be extracted from the database and used to re-build and optimize another SQL query at a subsequent time for an appropriate user.

2. The method of claim 1, wherein the query builder page includes a logical operator selection field including a plurality of logic operator types, and a selectable option for providing additional search parameter selection fields on the page.

3. The method of claim 1, wherein the predetermined type is based on whether a predetermined relationship type is defined as being searchable.

4. The method of claim 1, further including:
   receiving a user selection of a logical operator parameter from the client system; and
   receiving a user selection of a second predetermined type in a second search parameter selection field from the client system,
   wherein the SQL query is built using the logical operator parameter and the second predetermined type.

5. The method of claim 4, wherein the logical operator includes one of an AND operator and an OR operator.

6. The method of claim 1, wherein the at least one operator selection field includes one of a mathematical operator and a operator.

7. The method of claim 1, wherein building a SQL query includes generating a SQL query using the metadata lookup tables.

8. The method of claim 7, wherein generating includes pulling rows out of a lookup table using JavaScript responsive to the user selections.

9. A database system, comprising:
a metadata-driven relational database, including a plurality of metadata lookup tables that describe objects and data that are stored in the database according to a first object schema, the metadata lookup tables stored in the database according to a second object schema allowing types of objects to be added to the first lookup table without changes to the first object schema, the second schema including a first lookup table configured to store different types of lookup values, a second lookup table configured to store the lookup values for the first table, and a third lookup table configured to store relationships between lookup values in the second lookup table;
a server module for providing a query building page to a client system over a network connection, wherein the page includes: (a) at least one search parameter selection field configured as a dropdown menu wherein a predetermined searchable type is enabled to selected from a list of searchable types populated by the first lookup table in the metadata lookup tables, (b) at least one operator selection field separate from the at least one search parameter selection field, and (c) at least one value selection field configured as a dropdown list and a text expression box wherein at least one value is enabled to be selected from a list of values populated by the second lookup table in the metadata lookup tables or entered by a user as an expression; and
a SQL engine for automatically generating SQL queries in response to user selections in the selection fields of the query building page,
wherein the user selections for a generated SQL query are stored to the metadata-driven relational database, and
wherein the SQL engine is able to re-build and optimize another SQL query at a subsequent time for an appropriate user when the user selections are extracted from the metadata-driven relational database.

10. The system of claim 9, further comprising a memory unit for storing the user selections.

11. The system of claim 9, wherein the SQL engine generates queries using JavaScript to pull rows out of the metadata lookup tables.

12. A non-transitory computer-readable medium including code for controlling a processor on a database server to dynamically generate a SQL query for searching a relational database system, the code including instructions to:
store, in a database associated with the database system, metadata lookup tables that describe objects and data that are stored in the database according to a first object schema, the metadata lookup tables stored in the database according to a second object schema allowing types of objects to be added to the first lookup table without changes to the first object schema, the second schema including a first lookup table configured to store different types of lookup values, a second lookup table configured to store the lookup values for the first table, and a third lookup table configured to store relationships between lookup values in the second lookup table
provide a query builder page to a client system over a network connection, said page including: (a) configured as a dropdown menu wherein a predetermined searchable type is enabled to be selected from a list of searchable types populated by the first lookup table in the metadata lookup tables, (b) at least one operator selection field separate from the at least one search parameter selection field, and (c) at least one value selection field configured as a dropdown list and a text expression box wherein at least one value is enabled to be selected from a list of values populated by the second lookup table in the metadata lookup tables or entered by a user as an expression;
receive a user selection of the predetermined relationship type between items in the at least one search parameter selection field, a user selection of a first operator in the at least one operator selection field, and a user selection of a first value representing an item in the at least one value selection field;
dynamically build an SQL query based on the user selections in the at least one parameter selection field, at least one operator selection field, and at least one value selection field; and
store the user selections in the at least one parameter selection field, at least one operator selection field, and at least one value selection field in the database associated with the database system,
wherein the user selections are able to be extracted from the database and used to re-build and optimize another SQL query at a subsequent time for an appropriate user.

13. The computer-readable storable medium of claim 12, wherein the query builder page includes a logical operator selection field including a plurality of logic operator types, and a selectable option for providing additional search parameter selection fields on the page.

14. The computer-readable storable medium of claim 12, wherein the predetermined type is based on whether a predetermined relationship type is defined as being searchable.

15. A computer-implemented method of performing a web-based search on a relational database system, the method comprising:
storing, in a database associated with a database server, metadata lookup tables that describe objects and data that are stored in the database according to a first object schema, the metadata lookup tables stored in the database according to a second object schema allowing types of objects to be added to the first lookup table without changes to the first object schema, the second schema including a first lookup table configured to store different types of lookup values, a second lookup table configured to store the lookup values for the first table, and a third lookup table configured to store relationships between lookup values in the second lookup table;
receiving a query builder page from the database server of the relational database system over a network connection, said page including at least one search parameter selection field configured as a dropdown menu wherein a predetermined searchable type is enabled to be selected from a list of searchable types populated by the first lookup table in the metadata lookup tables, (b) at least one operator selection field separate from the at least one search parameter selection field, and (c) at least one value selection field configured as a dropdown list and a text expression box wherein at least one value is enabled to be selected from a list of values populated by the second lookup table in the metadata lookup tables or entered by a user as an expression;
receiving a user selection of the predetermined type in the at least one search parameter selection field, a first operator in the at least one operator selection field, and a first value in the at least one value selection field;
transmitting the user selections to the database server; and
receiving a search response page from the database server responsive to transmission of the user selection, wherein the database server dynamically builds an SQL query based on the user selections and executes the SQL query to generate the search response page, wherein the database server stores the user selected predetermined type to the database, and wherein the database server is further programmed to extract the user selections from the relational database system in order to re-build and optimize another SQL query at a subsequent time for an appropriate user.

16. The computer-implemented method of claim 15, wherein the query builder page includes a logical operator selection field including a plurality of logic operator types, and a selectable option for providing additional search parameter selection fields on the page.

17. The computer-implemented method of claim 15, wherein the predetermined type is based on whether the predetermined type is defined as being searchable.

18. The computer-implemented method of claim 15, wherein the database server builds the SQL query by pulling rows out of a lookup table using JavaScript in response to receiving the user selection.

* * * * *